United States Patent [19]
Labaziewicz et al.

[11] Patent Number: 5,404,189
[45] Date of Patent: Apr. 4, 1995

[54] PANORAMIC VIEWFINDER MASK

[75] Inventors: Peter Labaziewicz, Rochester, N.Y.; Nobuo Komatsu, Suwa, Japan

[73] Assignee: Eastman Kodak Company, Rochester, N.Y.

[21] Appl. No.: 160,012

[22] Filed: Nov. 30, 1993

[51] Int. Cl.[6] .................................................. G03B 13/10
[52] U.S. Cl. .................................................. 354/222
[58] Field of Search .............. 354/222, 219, 220, 221, 354/222, 223, 224, 225, 159

[56] References Cited

U.S. PATENT DOCUMENTS

| | | | | |
|---|---|---|---|---|
| Re. 32,797 | 12/1988 | Harvey | ...................... | 354/481 |
| 2,157,547 | 5/1939 | Leitz | ...................... | 354/222 |
| 4,357,102 | 11/1982 | Taren | ...................... | 355/77 |
| 4,716,427 | 12/1987 | Shyu | ...................... | 354/159 |
| 4,973,997 | 11/1990 | Harvey | ...................... | 354/106 |
| 5,010,357 | 4/1991 | Misawa | ...................... | 354/159 |
| 5,066,971 | 11/1991 | Kodaira | ...................... | 354/465 |
| 5,086,311 | 2/1992 | Naka et al. | ...................... | 354/195.1 |
| 5,170,198 | 12/1992 | Cannon | ...................... | 354/105 |

Primary Examiner—Howard B. Blankenship
Attorney, Agent, or Firm—Peter J. Bilinski

[57] ABSTRACT

The viewfinder of a camera include one or more lens elements that zoom in coordination with the camera's taking lens, and normal/panoramic masking plates that pivot about horizontal axis in coordination, with moving masking plates for the camera's back frame opening or with signaling elements. Since the panoramic masking plates are not in the image plane, the aperture in a provided aperture plate is a horizontal slit opening, which provides a great depth of focus, to maintain image sharpness, when the masking plates are in the panoramic position.

4 Claims, 2 Drawing Sheets

PANORAMIC VIEWFINDER MASK

FIELD OF THE INVENTION

The invention relates generally to the field of photographic cameras, and particularly to a real image viewfinder for a camera that has a normal and panoramic mode.

BACKGROUND OF THE INVENTION

A panoramic photograph is one that is made from a narrow portion of an exposure having a greater width-to-length ratio, e.g., 1:3 than a normal size photographic exposure. When panoramic photography is carried out, the area of the exposure corresponding to a fully sized frame outside the exposure of the panoramic size frame constitutes unexposed areas in which predetermined data may be recorded by a camera. Masks or masking plates may also be used to cover the back frame of a camera, to signal to a photofinisher that a panoramic photograph is desired to be printed.

Cameras have been developed for producing both panoramic and normal photographs. A camera that produces panoramic and normal size photographs has masking plates selectively movable for masking the field lens so as to form a picture frame of a panoramic size, or for exposing a larger portion of the field lens for producing an image of normal size. An actuating mechanism provided on the lens mount selectively sets the masking plates in either the panoramic or normal size position.

When switching from the normal to the panoramic mode, the mask appearing in the viewfinder of the camera is changed in coordination with the position of the masking plates masking the back frame of the camera to give an indication to the user of the camera, that the camera is in the panoramic mode. When the masking plates are in the panoramic mode, the masking plates limit the field of view through the viewfinder. Thus, the viewfinder will also indicate the field of view of the camera in the panoramic mode.

Cameras with which photographs can be taken with great ease are in widespread use as compact cameras. Typically, the movable masking plate is placed in the image plane of the camera in order to produce sharp masking edges in the viewfinder. Sometimes, however, because of space constraints the movable masking plate can not be placed in the image plane of the viewfinder. When the movable masking plate is placed in locations that are somewhat removed from the image plane, portions of the mask will appear fuzzy in the viewfinder.
Problems To Be Solved By The Invention One of the disadvantages of locating the movable masking plate to positions that are not near the image plane is that portions of the framing mask will not be sharp when viewed in the viewfinder. This is not aesthetically pleasing and is annoying to a photographer.

Another disadvantage of the prior art is that framing of the photograph is less accurate and more difficult, since the framing mask viewed in the viewfinder will not have sharp and crisp borders.

SUMMARY OF THE INVENTION

The present invention overcomes the disadvantages of the prior art by providing a camera that includes a plurality of lens elements that zoom in coordination with the camera's taking lens, and movable masking plates that pivot about horizontal axes in coordination with similar masking plates for the camera's back frame opening. Since the moving masking plates of the viewfinder are not in the image plane, the aperture for the lens elements is in the shape of a horizontal slit. The above provides a greater depth of focus to maintain viewfinder mask sharpness when the movable masking plates are in the panoramic mode.
Advantageous Effects Of The Invention One of the advantages of this invention is that when the movable masking plate is located at positions that are not near the image plane of the viewfinder the mask viewed in the viewfinder will be sharp. Therefore, the images of the scene being viewed will not be affected.

Another advantage of this invention is that it will be easier to frame a scene when a camera is in the panoramic mode, since the mask viewed in the viewfinder will have sharp and crisp borders.

The foregoing is accomplished by a camera having a real image viewfinder, a aperture plate, a fixed mask and a movable mask, that is not located in the image plane and that moves between a first position for taking normal photographs and a panoramic position for taking panoramic photographs the camera, wherein the opening in the aperture plate improves the sharpness of the sides of the framing mask which is produced by the movable mask and is viewed in the viewfinder.

DESCRIPTION OF THE PREFERRED EMBODIMENTS

Figure 1:
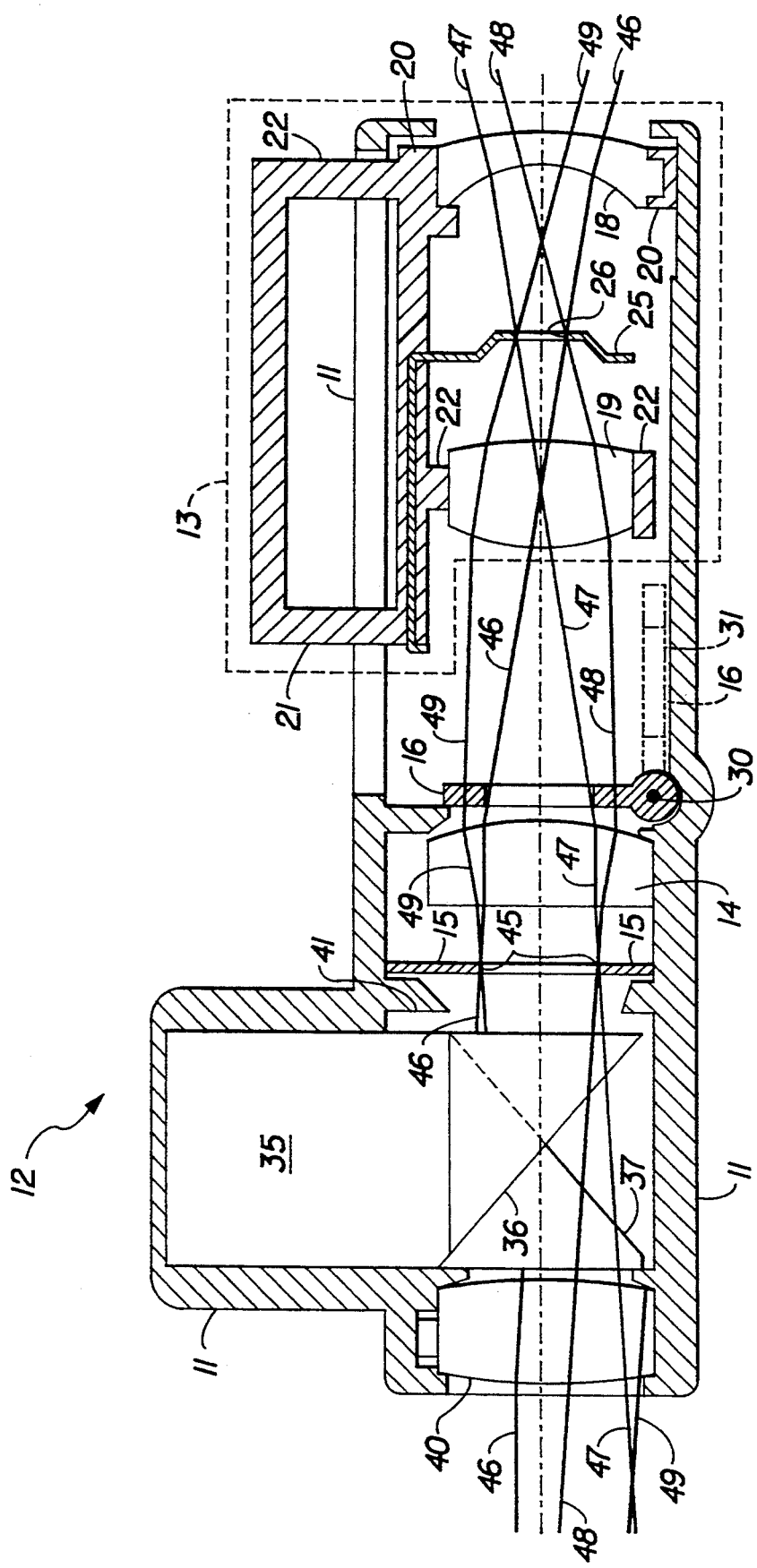
FIG. 1 is a drawing of a cross section of a real image viewfinder and zoom lens system.

Referring now to the drawings in detail, and more particularly to FIG. 1, the reference character 11 represents a housing for a real image viewfinder 12, a zooming lens system 13, a field lens 14, fixed masking plates 15, movable masking plates 16 and aperture plate 25. Zooming lens system 13 comprises: lens elements 18 and lens elements 19. Lens elements 18 are connected to mounting plate 20. Lens elements 19 are connected to mounting plate 22. Plate 22 is movable within housing 11.

Lens elements 18 and lens elements 19 may be moved with respect to each other and the taking lens of the camera (not shown) by movable assembly 21 to vary the angle of the light rays passing through lens elements 18 and 19. The changing of the range of angles at which rays from a scene can enter lens elements 18 and 19 alters the field of view, while the image is kept in the same image plane. When lens elements 18 and lens elements 19 move towards each other a narrower angle of the scene is produced, increasing the magnification of the scene. This would give a narrower more close-up view of the scene. When lens elements 18 and 19 are moved away from each other a wider angle of the scene is produced, decreasing the magnification of the scene. This would give a wider view of the scene.

Aperture plate 25 contains a slit 26. Aperture plate 25 is attached to mounting plate 22. Movable masking plates 16 rotate about housing 11. Pivot axis 30 is perpendicular to the axis of viewfinder 12. Movable masking plates 16 are shown in the panoramic mode. When movable masking plates 16 pivot about pivot 30 they will be at position 31. Position 31 is the normal mode location for movable masking plates 16.

Field lens 14 is connected to housing 11. Fixed masking plates 15 are in the image plane of viewfinder 12 and attached to housing 11. Viewfinder 12 comprises: porro prism 35; reflecting surfaces 36, 37 and two reflecting surfaces (not shown): field lens 14; lens elements 18; lens elements 19; and eye piece 40. Porro prism 35 is held in place by mount 41 and eye piece 40 is attached to housing 11.

Field lens 14 directs the light of the image towards fixed masking plates 15 and viewfinder 12. Fixed masking plates 15 are located in the image plane and cause the formation of the sharp sides of framing mask 60 and 65 (described in the description of FIGS. 4 and 5), that is viewed through eye piece 40 of viewfinder 12.

Figure 4:
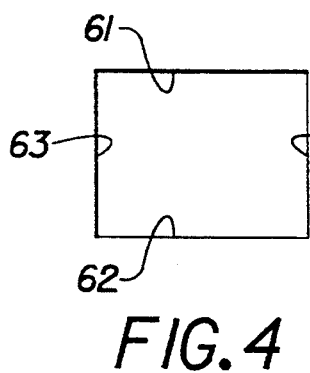
FIG. 4 is a drawing of the mask viewed in the viewfinder when the movable masking plates are in the normal mode.
Figure 5:
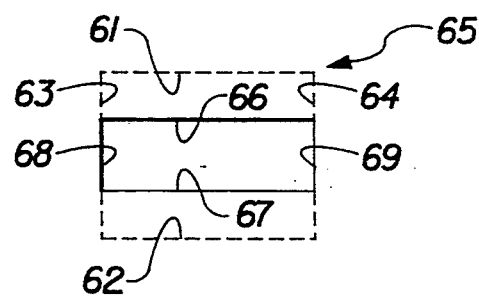
FIG. 5 is a drawing of the mask viewed in the viewfinder when the movable masking plates are in the panoramic mode.

Viewfinder 12 is the interface between the image recording functions and the visual perception of the image being taken by the photographer. The aiming of the camera at the subject and the delineating or framing the area that will be recorded, by the camera will be determined, by the scene, that appears in framing masks 60 or 65 (FIGS. 4 or 5).

Porro prism 35 and reflecting surfaces 36, 37 and the two reflective surfaces not shown erects the image that is going to be viewed by the photographer through eye piece 40. The photographer looks through eye piece 40 at the image at opening 45 of fixed masking plates 15, that was created by lens elements 18 and 19 in front of viewfinder 12.

Rays 46 and 47 illustrate sides 66, 67, 68 and 69 of framing mask 65 (FIG. 5) that will be viewed through eye piece 40, when movable masking plates 16 are in the panoramic mode. Rays 48 and 49 illustrate sides 61, 62, 63 and 64 of framing mask 60 (FIG. 4) when movable masking plates 16 are in the normal mode or at position 31.

Thus, fixed masking plates 15 and movable masking plates 16 are used to signal the photographer that there is a panoramic or normal image. Signaling elements i.e., a magnetic head or LED (not shown) will indicate to the photofinisher when a normal or panoramic photograph is being taken. A normal image is produced when movable masking plates 16 are located at position 31 and a panoramic image is produced when movable masking plates 16 are located at the position shown. Viewfinder 12 also indicates the field of view to the photographer. The field of view is created by fixed masking plates 15 and movable masking plates 16, that limits the field of view through viewfinder 12. When movable masking plates 16 are in the panoramic mode, they are still close enough to the image plane (the location of fixed masking plates 15) of viewfinder 12 to let the sides of framing mask 65 (FIG. 5) give an indication of the field of view of the camera.

Since movable masking plates 16 are not directly in the image plane, movable masking plates 16 will cause two of the sides i.e., sides 66 and 67 of framing mask 65 to appear blurry, when viewed through eye piece 40. Thus, the upper side 66 and lower side 67 of framing mask 65 (FIG. 5) are blurry. The image of the scene is still sharp. To reduce the blurring of the sides 66 and 67 of framing mask 65 aperture 26 of aperture plate 25 is in the shape of a horizontal slit.

Figure 2:
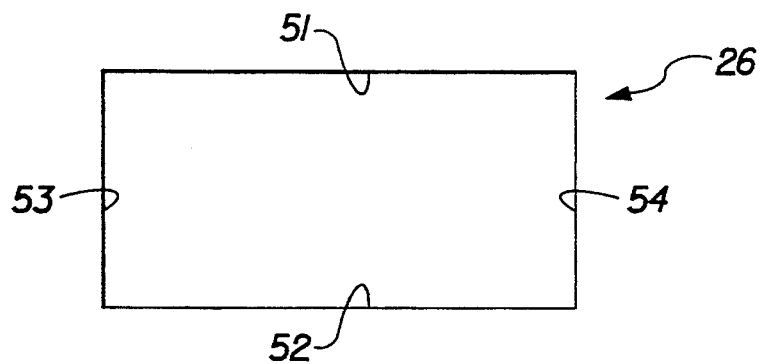
FIG. 2 is a drawing of the shape of the aperture of the viewfinder shown in FIG. 1.

FIG. 2 is a drawing of the shape of the aperture plate 26 of the aperture 26 of viewfinder 12 (FIG. 1). Aperture 26 has two horizontal sides 51 and 52 and two vertical sides 53 and 54. Sides 51, 52, 53 and 54 together form a horizontal slit.

Aperture 26 allows sufficient light to pass through aperture plate 25. In the sideways or horizontal direction sides 51 and 52 are sufficiently long enough to have an effective small f/number or large aperture, which lets an adequate amount of light through. In the opposite or vertical direction, sides 53 and 54 are relatively small, which gives a great depth of focus to the image as viewed in eye piece 40 (FIG. 1) in the horizontal direction. This increased depth of focus makes sides 66 and 67 of framing mask 65 (FIG. 5) appear much sharper. Thus, having aperture 26 in the shape of a slit creates high-quality sides 66 and 67 to framing mask 65, when the camera is in the panoramic mode. Sides 68 and 69 will already be of high quality, because they are formed by fixed masking plate 15 which is in the image plane and therefore sharp.

Figure 3:
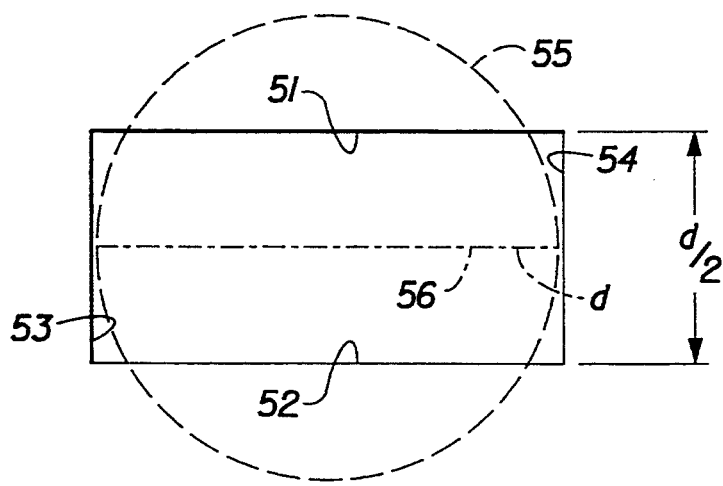
FIG. 3 is a drawing of the aperture shown in FIG. 2 superimposed on a round prior art aperture.

FIG. 3 is a drawing of the aperture 26 shown in FIG. 2, as superimposed on a round prior art aperture 55. Aperture 55 had a diameter 56. The length of diameter 56 is equal to d. The dimension of sides 51 and 52 of aperture 26 are such that the length of sides 51 and 52 will not be substantially larger than length d, of diameter 56 of prior art aperture 51. The vertical size of sides 53 and 54 of aperture 26 will be adjusted so that enough light will pass through eye piece 40 of viewfinder 12 without the sides of framing mask 65 (FIG. 5) appearing fuzzy. Typically the length of sides 51 and 52 would be equal to d/2 or less.

FIG. 4 is a drawing of the framing mask 60. Mask 60 is viewed through eye piece 40 of viewfinder 12, when movable masking plates 16 are in the normal mode i.e., position 31. Framing mask 60 has two horizontal sides 61 and 62 and two vertical sides 63 and 64.

FIG. 5 is a drawing of framing mask 65. Mask 65 is viewed through eye piece 40 of viewfinder 12, when movable masking plates 16 are in the panoramic mode. Framing mask 65 has two horizontal sides 66 and 67 and vertical sides 68 and 69 are formed by mask 15.

The above specification describes a new and improved viewfinder framing mask for a camera that takes photographs in the panoramic and normal modes. It is realized that the above description may indicate to those skilled in the art additional ways in which the principals of this invention may be used without departing from the spirit. It is, therefore, intended that this invention be limited only by the scope of the appended claims.

Parts List
housing 11
real image viewfinder 12
zooming lens system 13
field lens 14
fixed masking plates 15
movable masking plates 16
lens elements 18
lens elements 19
mounting plate 20
movable assembly 21
mounting plate 22 aperture plate 25
slit 26
pivot axis 30
position 31
porro prism 35
reflecting surface 36
reflecting surface 37
eye piece 40
mount 41
opening 45
ray 46
ray 47
ray 48
ray 49
side 51
side 52
side 53
side 54
prior art aperture 55
diameter 56
framing mask 60
side 61
side 62
side 63
side 64
framing mask 65
side 66
side 67

What is claimed is:

1. A real image viewfinder comprising an aperture plate, an eyepiece, a fixed mask located in the image plane of a camera, and a movable mask that is not located in the image plane which is movable between a first position for taking normal photographs, and a second position for taking panoramic photographs, said fixed mask and said movable mask defining a framing mask for defining a field of view, is characterized by:

the aperture plate having a slit opening for improving the sharpness of the sides of the framing mask of the viewfinder which is produced by the movable mask and is viewed in the eyepiece.

2. The viewfinder claimed in claim 1, wherein the slit opening has horizontal and vertical dimensions wherein the horizontal dimensions of the slit opening are substantially larger than the vertical dimensions of the slit opening.

3. A camera having one or more viewfinder lens elements, one or more movable masking plates that are not located in the image plane and are movable between a normal position and a panoramic position, one or more fixed masking plates in coordination with the movable masking plates which are located in the image plane, and an aperture plate aligned with said viewfinder lens elements and having an opening, is characterized in that:

the opening of the aperture plate is a slit opening having horizontal and vertical dimensions, wherein one of said horizontal or vertical dimensions is substantially larger than the other of said dimensions for providing a increased depth of focus for maintaining sharpness of a perceived image when said one or more movable masking plates are in the panoramic position.

4. A camera having one or more viewfinder lens elements, an aperture plate located adjacent said lens elements and having an opening, one or more movable masking plates that are not located in the image plane of the camera and are pivotable between a normal position and a panoramic position in coordination with panoramic signaling elements, is characterized by:

the opening is a horizontal slit for providing a greater depth of focus in a framing mask defined by said one or more movable masking plates when said one or more movable masking plates are in the panoramic position.

* * * * *